United States Patent
Zeghidour et al.

(10) Patent No.: US 12,482,452 B2
(45) Date of Patent: Nov. 25, 2025

(54) LEARNED AUDIO FRONTEND MACHINE LEARNING MODEL FOR AUDIO UNDERSTANDING

(71) Applicant: Google LLC, Mountain View, CA (US)

(72) Inventors: Neil Zeghidour, Paris (FR); Olivier Teboul, Paris (FR); Félix de Chaumont Quitry, Zürich (CH); Marco Tagliasacchi, Kilchberg (CH)

(73) Assignee: Google LLC, Mountain View, CA (US)

( * ) Notice: Subject to any disclaimer, the term of this patent is extended or adjusted under 35 U.S.C. 154(b) by 311 days.

(21) Appl. No.: 18/029,843

(22) PCT Filed: Oct. 4, 2021

(86) PCT No.: PCT/US2021/053425
§ 371 (c)(1),
(2) Date: Mar. 31, 2023

(87) PCT Pub. No.: WO2022/072941
PCT Pub. Date: Apr. 7, 2022

(65) Prior Publication Data
US 2023/0377561 A1 Nov. 23, 2023

Related U.S. Application Data

(60) Provisional application No. 63/087,144, filed on Oct. 2, 2020.

(51) Int. Cl.
*G10L 15/02* (2006.01)
*G10L 15/16* (2006.01)
(52) U.S. Cl.
CPC .............. *G10L 15/02* (2013.01); *G10L 15/16* (2013.01)

(58) Field of Classification Search
CPC ................................ G10L 15/02; G10L 15/16
See application file for complete search history.

(56) References Cited

U.S. PATENT DOCUMENTS

| 2015/0032449 A1* | 1/2015 | Sainath ................... G10L 15/16 704/235 |
| 2018/0174575 A1 | 6/2018 | Bengio et al. |

(Continued)

FOREIGN PATENT DOCUMENTS

| CN | 108648748 A | 10/2018 |
| CN | 110574049 A | 12/2019 |

OTHER PUBLICATIONS

Noe et al.("CGCNN: Complex Gabor Convolutional Neural Networks on Raw Speech," Proceedings of 2020 IEEE International Conference on Acoustics, Speech and Signal Processing (ICASSP), May 4-8, 2020, p. 7724-7728 (Year: 2020).*

(Continued)

*Primary Examiner* — Bhavesh M Mehta
*Assistant Examiner* — Joseph J. Yamamoto
(74) *Attorney, Agent, or Firm* — Fish & Richardson P.C.

(57) ABSTRACT

Methods, systems, and apparatus, including computer programs encoded on computer storage media, for processing audio inputs using a learned audio frontend machine learning model that processes the audio input to generate a representation of the audio input. The representation can then be processed by an audio understanding model to generate a respective output for each of one or more audio understanding tasks.

20 Claims, 4 Drawing Sheets

(56) References Cited

U.S. PATENT DOCUMENTS

| | | | |
|---|---|---|---|
| 2018/0261213 A1 | 9/2018 | Arik et al. | |
| 2018/0277099 A1* | 9/2018 | Zou | G10L 15/16 |
| 2020/0322377 A1* | 10/2020 | Lakhdhar | G10L 17/04 |

OTHER PUBLICATIONS

Wang et al.("Trainable frontend for robust and far-field keyword spotting" Proceedings of 2017 IEEE International Conference on Acoustics, Speech and Signal Processing (ICASSP), Mar. 5, 2017, p. 5670-5674 (Year: 2018).*
R. Fan and G. Liu, "CNN-Based Audio Front End Processing on Speech Recognition," 2018 International Conference on Audio, Language and Image Processing (ICALIP), Shanghai, China, 2018, pp. 349-354, (Year: 2018).*
Anden et al., "Deep scattering spectrum," IEEE Transactions on Signal Processing, Aug. 15, 2014, 62(16):4114-4128.
Arcas et al., "Now Playing: Continuous low-power music recognition," CoRR, submitted on Nov. 29, 2017, arXiv:1711.10958v1, 5 pages.
Ba et al., "Layer normalization," CoRR, submitted on Jul. 21, 2016, arXiv: 1607.06450v1, 14 pages.
Balestriero et al., "Spline filters for end-to-end deep learning," Proceedings of International conference on machine learning (PMLR), Jul. 3, 2018, pp. 364-373.
Battenberg et al., "Reducing bias in production speech models," CoRR, submitted on May 11, 2017, Xiv:1705.04400v1, 10 pages.
Cao et al., "CREMA-D: Crowd-sourced emotional multimodal actors dataset," IEEE transactions on affective computing, Jul. 8, 2014, 5(4):377-390.
Engel et al., "Neural Audio Synthesis of Musical Notes with WaveNet Autoencoders," CoRR, submitted on Apr. 5, 2017, arXiv:1704. 01279v1, 16 pages.
EP Communication Pursuant to Article 94(3) EPC in European Appln No. 21801333.2, dated Nov. 20, 2023, 6 pages.
Falk et al., "Modulation spectral features for robust far-field speaker identification," Proceedings of IEEE Transactions on Audio, Speech, and Language Processing, Jan. 2009, 18(1):90-100.
Gabor, "Theory of communication. part 1: The analysis of information," Journal of the Institution of Electrical Engineers-part III: radio and communication engineering, Nov. 1, 1946, 93(26):429-441.
Gemmeke et al., "Audio set: An ontology and human-labeled dataset for audio events," IEEE International Conference on Acoustics, Speech and Signal Processing (ICASSP), Mar. 5, 2017, pp. 776-780.
Greenwood, "The Mel scale's disqualifying bias and a consistency of pitch-difference equisections in 1956 with equal cochlear distances and equal frequency ratios," Hearing Research, Jan. 1, 1997, 103:199-224.
He et al., "Deep residual learning for image recognition," Proceedings of the IEEE conference on computer vision and pattern recognition, Jun. 26-Jul. 1, 2016, pp. 770-778.
Heittola et al., "TUT Urban Acoustic Scenes 2018, Development dataset," Apr. 24, 2018, retrieved on Feb. 21, 2024, URL <https://zenodo.org/records/1228142>, 7 pages.
Hershey et al., "CNN architectures for large-scale audio classification," CoRR, submitted on Jan. 10, 2017, arXiv:1609.09430v2, 5 pages.
Hinton et al., "Deep neural networks for acoustic modeling in speech recognition: The shared views of four research groups," IEEE Signal processing magazine, Nov. 2012, 29(6):82-97.
Hoshen et al., "Speech acoustic modeling from raw multichannel waveforms," Proceedings of 2015 IEEE international conference on acoustics, speech and signal processing (ICASSP), Apr. 19, 2015, pp. 4624-4628.
Huang et al., "Densely connected convolutional networks," Proceedings of the IEEE conference on computer vision and pattern recognition, Jul. 21-26, 2017, pp. 4700-4708.
International Preliminary Report on Patentability in International Appln. No. PCT/US2021/053425, mailed on Apr. 13, 2023, 9 pages.
International Search Report and Written Opinion in International Appln. No. PCT/US2021/053425, mailed on Feb. 28, 2022, 15 pages.
Jaitly et al., "Learning a better representation of speech sound waves using restricted boltzmann machines," Proceedings of IEEE International Conference on Acoustics, Speech and Signal Processing (ICASSP), May 22, 2011, pp. 5884-5887.
Kingma et al., "Adam: A method for stochastic optimization," CoRR, submitted on Jan. 30, 2017, arXiv:1412.6980v9, 15 pages.
Kong et al., "PANNs: Large-Scale Pretrained Audio Neural Networks for Audio Pattern Recognition," CoRR, submitted on Dec. 21, 2019, arXiv:1912.10211v1, 13 pages.
Krizhevsky et al., "Imagenet classification with deep convolutional neural networks," Proceedings of the 25th International Conference on Neural Information Processing Systems, Dec. 2012, pp. 1097-1105.
Lostanlen et al., "Birdvox-full-night: A dataset and benchmark for avian flight call detection," Proceedings of 2018 IEEE International Conference on Acoustics, Speech and Signal Processing (ICASSP), Apr. 15, 2018, pp. 266-270.
Lostanlen et al., "Per-channel energy normalization: Why and how," IEEE Signal Processing Letters, Oct. 28, 2018, 26(1):39-43.
Lyons et al., "Effect of compressing the dynamic range of the power spectrum in modulation filtering based speech enhancement," Ninth Annual Conference of the International Speech Communication Association, Sep. 22-26, 2008, 4 pages.
Nagrani et al., "VoxCeleb: A large-scale speaker identification dataset," 18th Annual Conference of the International Speech Communication Association, Aug. 20-24, 2017, 5 pages.
Noe et al., "CGCNN: Complex Gabor Convolutional Neural Network on Raw Speech," Proceedings of 2020 IEEE International Conference on Acoustics, Speech and Signal Processing (ICASSP), May 4-8, 2020, pp. 7724-7728.
Palaz et al., "Convolutional neural networks-based continuous speech recognition using raw speech signal," IEEE International Conference on Acoustics, Speech and Signal Processing (ICASSP), Apr. 19, 2015, pp. 4295-4299.
Palaz et al., "Estimating phoneme class conditional probabilities from raw speech signal using convolutional neural networks," CoRR, submitted on Jun. 12, 2013, arXiv:1304.1018v2, 5 pages.
Pariente et al., "Filterbank design for end-to-end speech separation," Proceedings of IEEE International Conference on Acoustics, Speech and Signal Processing (ICASSP), May 4, 2020, pp. 6364-6368.
Park et al., "SpecAugment: A simple data augmentation method for automatic speech recognition," CoRR, submitted on Dec. 3, 2019, arXiv:1904.08779v3, 6 pages.
Ravanelli et al., "SincNet," Mar. 15, 2021, retrieved on Mar. 12, 2024, retrieved from URL <https://github.com/mravanelli/SincNet>, 6 pages.
Ravanelli et al., "Speaker recognition from raw waveform with sincnet," 2018 IEEE Spoken Language Technology Workshop (SLT), Dec. 18-21, 2018, pp. 1021-1028.
Revay et al., "Multiclass language identification using deep learning on spectral images of audio signals," CoRR, submitted on May 10, 2019, arXiv:1905.04348v1, 7 pages.
Sainath et al., "Learning filter banks within a deep neural network framework," Proceedings of 2013 IEEE workshop on automatic speech recognition and understanding, Dec. 8, 2013, pp. 297-302.
Sainath et al., "Learning the Speech Front-end with Raw Waveform CLDNNs," Proceedings of Sixteenth Annual Conference of the International Speech Communication Association, Sep. 2015, 5 pages.
Schluter et al., "Gammatone Features and Feature Combination for Large Vocabulary Speech Recognition," Proceedings of 2007 IEEE International Conference on Acoustics, Speech and Signal Processing, Apr. 15-20, 2007, 5 pages.
Schluter et al., "Zero-mean convolutions for level-invariant singing voice detection," Proceedings of the 19th International Society for Music Information Retrieval Conference (ISMIR), Sep. 2018, pp. 321-326.

(56) References Cited

OTHER PUBLICATIONS

Schneider et al., "wav2vec: Unsupervised Pre-training for Speech Recognition," CoRR, submitted on Sep. 11, 2019, arXiv:1904.05862v4, 9 pages.

Senior et al., "Acoustic modelling with CD-CTC-SMBR LSTM RNNS," Proceedings of 2015 IEEE Workshop on Automatic Speech Recognition and Understanding (ASRU), Dec. 13-17, 2015, 6 pages.

Stowell et al., "Automatic acoustic detection of birds through deep learning: the first Bird Audio Detection challenge" CoRR, submitted on Jul. 16, 2018, arXiv:1807.05812v1, 21 pages.

Synnaeve et al., "End-to-end ASR: from Supervised to Semi-Supervised Learning with Modern Architectures," CoRR, submitted on Nov. 19, 2019, arXiv:1911.08460v1, 7 pages.

Tan et al., "EfficientNet: Rethinking Model Scaling for Convolutional Neural Networks," Proceedings of the 36th International Conference on Machine Learning (PMLR), Jun. 9-15, 2019, 97:6105-611.

Thomas et al., "Hilbert envelope based features for far-field speech recognition," Proceedings of the 5th international workshop on Machine Learning for Multimodal Interaction, Sep. 2008, pp. 119-124.

Tjandra et al., "Attention-based wav2text with feature transfer learning," CoRR, submitted on Sep. 22, 2017, arXiv:1709.07814v1, 7 pages.

Wang et al., "Trainable frontend for robust and far-field keyword spotting," Proceedings of 2017 IEEE International Conference on Acoustics, Speech and Signal Processing (ICASSP), Mar. 5, 2017, pp. 5670-5674.

Warden, "Speech Commands: A Dataset for Limited-Vocabulary Speech Recognition," CoRR, submitted on Apr. 9, 2018, arXiv:1804.03209v1, 11 pages.

Zeghidour et al., "A universal learnable audio frontend," International Conference on Learning Representations (ICLR 2021), Sep. 28, 2020, 12 pages.

Zeghidour et al., "End-to-End Speech Recognition from the Raw Waveform," CoRR, submitted on Jun. 21, 2018, arXiv:1806.07098v2, 5 pages.

Zeghidour et al., "Learning filterbanks from raw speech for phone recognition," Proceedings of 2018 IEEE International Conference on Acoustics, Speech and Signal Processing (ICASSP), Apr. 15, 2018, pp. 5509-5513.

Zeghidour, "Time-Domain Filterbanks," Mar. 13, 2018, retrieved on Mar. 12, 2024, retrieved from URL <https://github.com/facebookresearch/tdfbanks>, 3 pages.

Zhang et al., "mixup: Beyond empirical risk minimization," CoRR, submitted on Oct. 25, 2017, arXiv:1710.09412v1, 11 pages.

Zhang, "Making Convolutional Networks Shift-Invariant Again," CoRR, submitted on Jun. 9, 2019, arXiv:1904.11486v2, 17 pages.

Office Action in Chinese Appln. No. 2025052800045640, mailed on May 28, 2025, 17 pages (with English translation).

* cited by examiner

LEARNED AUDIO FRONTEND MACHINE LEARNING MODEL FOR AUDIO UNDERSTANDING

CROSS-REFERENCE TO RELATED APPLICATION

This application is a National Stage Application under 35 U.S.C. § 371 and claims the benefit of International Application No. PCT/US2021/053425, filed Oct. 4, 2021, which claims priority to U.S. Application No. 63/087,144, filed Oct. 2, 2020, the disclosure of which is incorporated herein by reference.

BACKGROUND

This specification relates to processing audio using machine learning models.

Examples of machine learning models include support vector machines, decision forests, linear models, and neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes an audio signal, i.e., an audio waveform that includes a sequence of audio samples, e.g., amplitude values, using a machine learning model to generate an output for an audio understanding task.

The audio understanding task can be any task that requires processing an audio waveform to generate a prediction that characterizes the audio waveform.

Particular embodiments of the subject matter described in this specification can be implemented so as to realize one or more of the following advantages.

Many existing neural network systems that perform audio understanding tasks use mel-filterbank representations of input audio waveforms. Mel-filterbanks are fixed, engineered audio features which emulate human perception. However, mel-filterbanks are limited by the fundamental limitations of manually engineered representations. This specification describes a single, universal learnable frontend that outperforms mel-filterbanks over a wide range of audio domains, including speech, music, audio events and animal sounds, providing a general purpose learned frontend for audio. In particular, this specification describes a lightweight, fully learnable architecture that can be used as a drop-in replacement of mel-filterbanks. In other words, this learned audio frontened model has few parameters and, because these parameters are learned, can result in improved performance with minimal computational overhead, both during training and at inference.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that processes an audio signal, i.e., an audio waveform that includes a sequence of audio samples, e.g., amplitude values, using a machine learning model to generate an output for an audio understanding task.

The audio understanding task can be any task that requires processing an audio waveform to generate a prediction that characterizes the audio waveform.

For example, if the input is an audio sequence, i.e., an audio waveform, representing a spoken utterance, the audio understanding task can be speech recognition, e.g., with an output that defines a score for each of a set of pieces of text, each score representing an estimated likelihood that the piece of text is the correct transcript for the utterance.

As another example, the audio understanding task may be a keyword spotting task where, if the input is an audio sequence representing a spoken utterance, the output can indicate whether a particular word or phrase ("hotword") was spoken in the utterance.

As another example, the audio understanding task can be a language identification task where, if the input is an audio sequence representing a spoken utterance, the output generated by the trainee neural network can identify the natural language in which the utterance was spoken.

The audio understanding task can also be a task that is performed on audio that is not speech. Examples of such audio understanding tasks include music recognition tasks that receive an audio sequence as input and generate a prediction of the name or other property of a piece of music that is represented in the input, animal classification tasks that receive an audio input that includes one or more animal sounds and generate a prediction of a category of animal that is making the animal sounds, audio event classification tasks in which the input is an audio sequence is a prediction of, for each of multiple different sounds, at what temporal instances the sound is active within the audio sequence, and so on.

More generally, while this specification describes a frontend that can replace a mel-filterbank representation when processing an audio signal, the frontend can also instead replace a manually engineered or other learned representation of a different kind of input signal, e.g., seismic data or physiological recordings.

Figure 1:
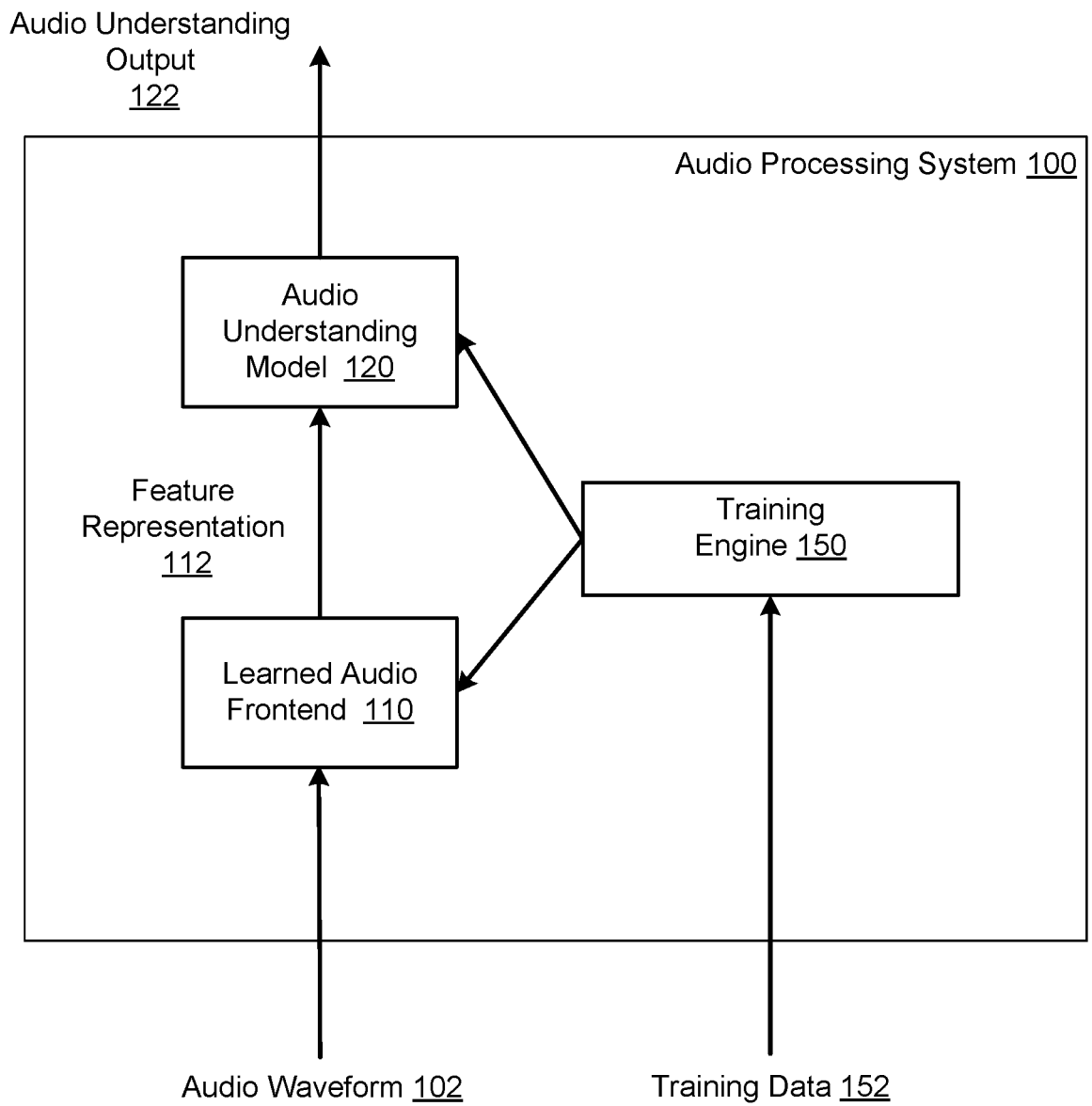
FIG. 1 shows an example audio processing system.

FIG. 1 shows an example audio processing system 100. The audio processing system 100 is an example of a system implemented as computer programs on one or more computers in one or more locations, in which the systems, components, and techniques described below can be implemented.

The audio processing system 100 obtains an audio waveform 102 as input. The audio waveform 102 is a sequence of audio samples, e.g., amplitude values, at a first frequency ("sampling frequency").

The audio processing system 100 processes the audio waveform 102 using a learned audio frontend model 110 to generate a feature representation 112 of the audio waveform.

Generally, the audio frontend model 110 is a machine learning model that is configured to apply a learned filtering operation that has a plurality of filtering parameters, a learned pooling operation that has a plurality of pooling parameters, and a learned normalization operation that has a plurality of normalization parameters to generate the feature representation 112 of the audio waveform 102.

The operations performed by the audio frontend model 110 to generate the feature representation 112 are described in more detail below with reference to FIGS. 2-4.

The system 100 processes the feature representation 112 using an audio understanding machine learning model 120. The audio understanding machine learning model 120 is a machine learning model that has parameters ("audio understanding parameters") that is configured to process the feature representation 112 to generate a respective output 122 for each of one or more audio understanding tasks, e.g., for one or more of the tasks described above or for a different task that requires making a prediction about the content of the audio waveform 102.

The audio understanding model 120 can be any appropriate model, e.g., one that was previously configured to receive a mel-filterbank representation of an audio signal as input. That is, as a particular example, the audio frontend model 110 can replace, in an audio processing pipeline, a system that maps an audio waveform into a mel-filterbank representation of the audio waveform that is provided as input to the audio understanding model 120.

Particular examples of audio understanding models that can receive as input the feature representation 112 include convolutional neural networks, e.g., those having an EfficientNet architecture, fully-connected neural networks, e.g., a multi-task neural network that has a respective set of linear layers for each of the multiple tasks, recurrent neural networks, e.g., long-short term memory (LSTM) or gated recurrent unit (GRU) based neural networks, or self-attention neural networks, e.g., Transformer neural networks.

The audio frontend model 110 is referred to as a "learned" audio frontend model because the values of the parameters of the learned audio frontend model, i.e., the values of the filtering, pooling, and normalization parameters, are learned end-to-end with the audio understanding model 120. In other words, the operations performed by the audio frontend model 110 are entirely differentiable, allowing the audio frontend model 110 to be trained jointly with a "backend" model through gradient descent. This is unlike other prominent representations, e.g., mel-filterbank representations, that are hard-coded and are therefore not able to be fine-tuned to improve the performance of a given model 120 on a given set of one or more audio processing tasks.

In particular, the system 100 includes a training engine 150 that trains the audio frontend model 110 and the audio understanding model 120 on respective training data for each of the one or more audio understanding tasks.

The training data for a given task includes a set of training audio inputs and, for each audio input, a target output for the given task that should be generated by the audio understanding model 120 by processing a feature representation for the training audio input that is generated by the audio frontend model 110.

The training engine 150 trains the models 110 and 120 on the training data 152 for a given task through gradient descent and, in particular, trains the audio frontend model 110 by backpropagating gradients of a loss function for the given task through the audio understanding model 120 and into the audio frontend model 110. The loss function can be any appropriate loss function for the task that measures the performance of the by the audio understanding model 120 on the given task given the target outputs in the training data for the given task, e.g., a classification loss if the audio understanding task is a classification task or a regression loss if the audio understanding task is a regression task. In particular, the system can train the models 110 and 120 to determine trained values of the parameters θ of the audio understanding model 120 and the parameters ψ of the audio frontend model 110 through any appropriate gradient descent based technique, e.g., stochastic gradient descent, Adam optimization, rmsProp optimization, and so on, to minimize the following:

$$\mathrm{argmin}_{\theta,\psi} E_{(x,y) \in D} L(g_\theta(F_\psi(x)), y),$$

where x is a training audio input sampled from the training data set D, y is the target output for the training input, $F_\psi(x)$ is the representation generated by the model 110 by processing the training audio input x, $g_\theta(F_\psi(x))$ is the output generated by the model 120 by processing the representation, and L is the loss function for the given task.

In some cases, the training engine 150 can pre-train the audio frontend model 110 on one or more tasks jointly with an original backend model and then train the audio frontend model 110 with a new backend model on a different task, e.g., while keeping the pre-trained values of the parameters of the model 110 fixed and updating the parameters of the new backend model or updating the parameters of the new backend model while also fine-tuning the pre-trained values of the parameters of the model 110. For example, this can be done in cases where there is a large amount of training data available for the one or more tasks that the original backend model performs while only a limited amount of training data is available for the task(s) that the new backend model performs.

Figure 2:
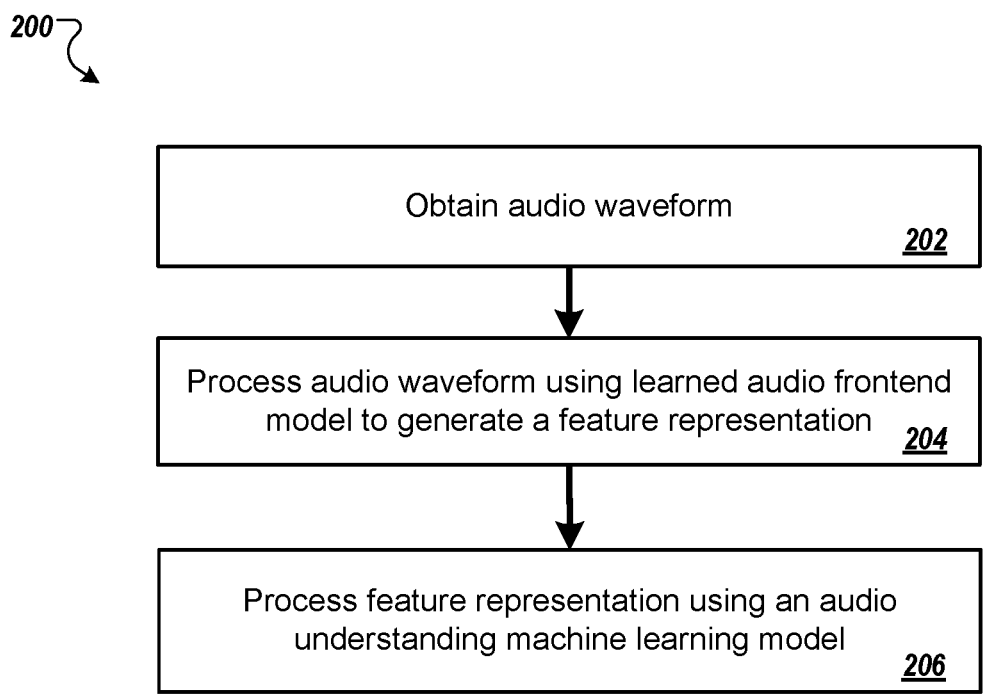
FIG. 2 is a flow diagram of an example process for training a policy neural network and an embedding neural network.

FIG. 2 is a flow diagram of an example process 200 for processing an audio input. For convenience, the process 200 will be described as being performed by a system of one or more computers located in one or more locations. For example, an audio processing system, e.g., the audio processing system 100 of FIG. 1, appropriately programmed, can perform the process 200.

The system obtains an audio waveform (step 202). The audio waveform is a sequence of audio samples at a first frequency. That is, the audio waveform is a sequence that has a respective scalar audio sample at each of T first time steps. In other words, the audio waveform is a one-dimensional waveform of T samples available at a sampling frequency $F_s$ Hz.

The system processes the audio waveform using a learned audio frontend model to generate a feature representation of the audio waveform (step 204).

The feature representation includes a sequence of features at a second frequency. Generally, the second frequency is lower than the first frequency.

More specifically, the operations of the learned audio frontend can be represented as a function with parameters that have been learned through the training of the learned audio frontend and that maps the audio waveform from a one-dimensional space to a 2-dimensional feature space, i.e., that maps the T scalar values in the audio waveform into a 2-dimensional M×N representation using learned parameters, where M denotes the number of temporal frames ("features") and N denotes the number of feature channels in each temporal frame ("feature") of the representation. Because the second frequency will generally be lower than the first frequency, the number of temporal frames M will generally be less than the number T of audio samples in the audio waveform.

Processing the audio waveform using the learned audio frontend model to generate the feature representation is described in more detail below with reference to FIGS. 3 and 4.

The system processes the feature representation using an audio understanding machine learning model having a plurality of audio understanding parameters to generate a respective output for each of one or more audio understanding tasks as described above (step 206).

Figure 3:
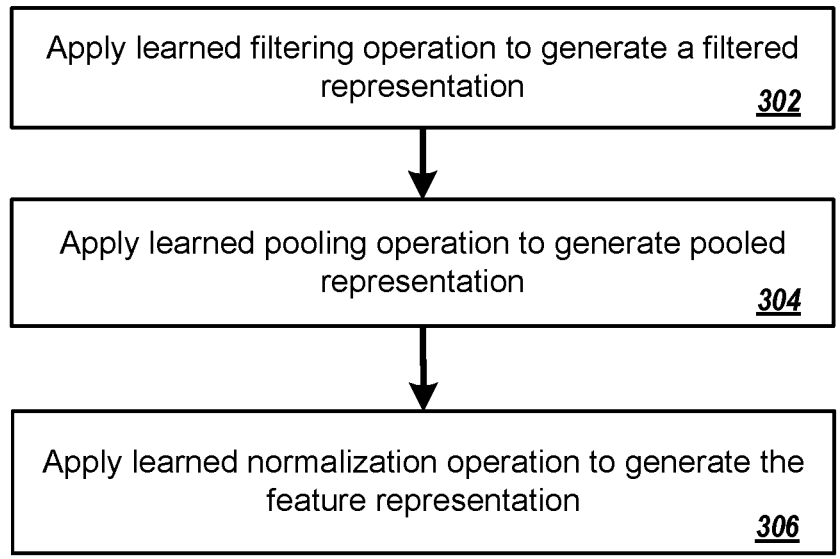
FIG. 3 is a flow diagram of an example process for training the policy neural network on a demonstration sequence.

FIG. 3 is a flow diagram of an example process 300 for generating a feature representation of an audio waveform using a learned audio frontend model. For convenience, the process 300 will be described as being performed by a system of one or more computers located in one or more locations. For example, an audio processing system, e.g., the audio processing system 100 of FIG. 1, appropriately programmed, can perform the process 300.

The system applies a learned filtering operation having a plurality of filtering parameters to the audio waveform to generate a filtered representation that includes a sequence of filtered features at the first frequency (step 302).

At a high level, the learned filtering operation passes the audio waveform through a bank of bandpass filters followed by a non-linearity, operating at the original sampling frequency $F_s$.

In other words, the sequence of filtered features includes a respective filtered feature at each of the first time steps in the audio waveform and, therefore, each filtered feature in the sequence has a corresponding audio sample in the audio waveform.

Generally, each filtered feature includes a respective value for each of a plurality of channels. That is, the learned filtering operation maps the T scalar audio samples in the input waveform to T filtered features that each have N feature channels, where N is greater than one.

To generate the values for any given channel of the filtered features, the system applies one or more one-dimensional convolutional filters to the audio waveform to generate the values of the filtered features for the channel.

In some implementations, for each channel, the system can apply a single one-dimensional convolutional filter with stride 1 to the audio waveform to generate the values of the filtered features for the channel.

As a particular example, each convolutional filter can be a complex-valued filter and the system can generate the T values $f_n$ of the filtered features for the n-th channel by performing operations that satisfy:

$$f_n = |x * \varphi_n|^2 \in \mathbb{R}^T,$$

where x is the audio waveform, $\varphi_n$ is the complex-valued filter for the channel n, and the *operation denotes convolution with stride 1. Applying the squared modulus operator brings the output of the convolution back to the real-valued domain.

In some other implementations, for each channel, the system can apply multiple one-dimensional convolutional filters with stride 1 to the audio waveform to generate the values of the filtered features for the channel.

As a particular example, for each channel, the system can apply a plurality of one-dimensional convolutional filters to the audio waveform to generate a plurality of convolved values and then combine the convolved values to generate the values for the channel.

More specifically, the system can apply 2N total real-valued one-dimensional filters to generate the T values $f_n$ of the filtered features for the n-th channel by performing operations that satisfy:

$$f_n = |x * \tilde{\varphi}_{2n-1}|^2 + |x * \tilde{\varphi}_{2n}|^2 \in \mathbb{R}^T,$$

where $\tilde{\varphi}_{2n-1}$ and $\tilde{\varphi}_{2n}$ are two of the 2N total real-valued one-dimensional filters that are used for computing the values of the n-th channel. For example, $\tilde{\varphi}_{2n-1}$ and $\tilde{\varphi}_{2n}$ can be the real and imaginary parts of a single complex-valued one-dimensional filter. Applying the 2N total filters in this manner can generate an output that is equivalent to the output generated using the complex-valued filters above, without requiring the system to explicitly manipulate complex numbers.

In some implementations, the system does not place any constraints on the values ("coefficients") of the one-dimensional filters that are learned during training, i.e., the one-dimensional filters are standard 1D convolutions. For example, the system can initialize the coefficients of the filters to approximate the computation of a mel-filterbank and then adjust the filters during training through backpropagation without placing any constraints on any of the coefficients in the filters.

In some of these implementations, to prevent instability during training, the system applies normalization, e.g., 12 normalization, to the filter coefficients before computing the convolutions.

In some implementations, the system does place constrains on the coefficients of the one-dimensional filters. In particular, the system can require that each of the plurality of one-dimensional convolutional filters be a Gabor filter.

Generally, Gabor filters are produced by modulating a Gaussian kernel with a sinusoidal signal. Formally, a Gabor filter $\varphi_n$ having length W is parametrized by its center frequency $\eta_n$ and inverse bandwidth $\sigma_n$ as follows:

$$\varphi_n(t) = e^{j2\pi\eta_n t} \frac{1}{\sqrt{2\pi}\sigma_n} e^{-\frac{t^2}{2\sigma_n^2}}, \text{ for } t = -W/2, \ldots, W/2.$$

That is, the equation above defines the W coefficients of a Gabor filter with length W. Thus, the frequency response of the Gabor filter $\varphi_n$ is a Gaussian centered at frequency $\eta_n$ and of bandwidth $1/\sigma_n$, both expressed in normalized frequency units in $[-1/2, 1/2]$.

For each of the N Gabor filters, the system only needs to learn two parameter values (the center frequency and inverse bandwidth) and learning these two parameter values for each filter allows learning a bank of smooth, quasi-analytic bandpass filters, with controllable center frequency and bandwidth.

Thus, Gabor filters have significantly fewer parameters than normalized 1D-convolutions. For example, N Gabor filters of length W are fully specified by 2N parameters, i.e., N for the center frequencies and N for the bandwidths, against W×N for a standard 1D-convolution. As a particular example, when using a window length of 25 ms and operating at a sampling rate of 16 kHz, then W=401 samples, and Gabor-based filtering accounts for 200 times fewer parameters than their unconstrained alternatives. This can make training significantly less computationally intensive and significantly reduce the memory footprint of the learned frontend without decreasing the performance of the frontend.

To apply the Gabor filters, the system obtains the impulse response of each of the N Gabor filters over the range $t=-W/2, \ldots,$ to $W/2$ and then convolves these impulse responses to the input waveform.

Alternatively, the system can apply the Gabor filters using 2N real valued filters rather than N complex valued Gabor filters as described above, i.e., by splitting real and imaginary part of the Gabor filter, convolving inputs with each one independently, and then merging the result using squared l2-pooling.

In some cases, to assist with stabilizing training, the system clips the center frequencies of the N Gabor filters to be in a predefined range, e.g., [0, ½] so that they lie in the positive part of the frequency range. The system can optionally also constrain the center frequency to be in a predefined range, e.g., the range [4 $\sqrt{2\log2}$, 2 W $\sqrt{2\log2}$] such that the full-width at half-maximum of the frequency response is within 1/W and ½.

The system applies a learned pooling operation having a plurality of pooling parameters to the filtered representation to generate a pooled representation that includes a sequence of pooled features at the second frequency (step 304). Each pooled feature has a respective value for each of the plurality of channels.

At a high level, the learned pooling operation decimates the signal represented by the filtered representation to reduce the temporal resolution of the filtered representation.

More specifically, the system implements the learned pooling operation through depthwise convolution with lowpass filters. Thus, each input channel is associated with one lowpass filter.

In other words, for each channel, the system performs the learned pooling operation by applying, with stride greater than one, a respective learned lowpass filter for the channel to the values in the filtered features for the channel to generate a set of pooled values for the channel that have the second frequency. By having the stride be greater than one, the system reduces the number of values in each channel, thereby reducing the temporal resolution of the filtered representation. The value of the stride can be a hyperparameter of the In some cases, the system parameterizes the respective learned lowpass filter for each channel to have a Gaussian impulse response. That is, the learned lowpass filter $\varphi_n$ having length W for channel n can satisfy:

$$\varphi_n(t) = e^{j2\pi \eta_n t} \frac{1}{\sqrt{2\pi}\sigma_n} e^{-\frac{t^2}{2\sigma_n^2}}, \text{ for } t = -W/2, \ldots, W/2.$$

Thus, the system can learn per-channel lowpass pooling functions while adding only N parameters to the frontend model.

The system applies a learned normalization operation having a plurality of normalization parameters to the pooled representation to generate the feature representation (step 306).

At a high level, the learned normalization operation normalizes the pooled representation and then applies a non-linearity to the pooled representation to reduce the dynamic range of the pooled representation.

In particular, for each respective value for each of the plurality of channels of each pooled feature, the system normalizes the respective value in accordance with one or more of the normalization parameters and then applies a non-linearity to the normalized respective value in accordance with one or more of the normalization parameters to generate the corresponding value in the feature representation.

As a particular example, the system can apply a non-linearity to the normalized respective value by adding a learned offset to the normalized value to generate a sum and applying compression to the sum using a learned exponent. For example, the system can learn a respective offset and a respective exponent for each channel.

As another particular example, for each respective value for each of the plurality of channels of each pooled feature, the system can normalize the respective value using an exponential moving average of the values for the channel in any pooled features that are before the pooled feature in the sequence. The exponential moving average is controlled by a respective smoothing coefficient.

For example, the exponential moving average M(t,n) for a value F(t,n) of channel n in the feature with index t can be recursively defined as:

$$M(t,n)=(1-s_n)M(t-1,n)+s_nF(t,n),$$

where $s_n$ is the smoothing coefficient for channel n.

Thus, a particular example of the learned normalization operation can satisfy $$sCEN((F(t, n)) = \left(\frac{F(t, n)}{(\varepsilon + M(t, n))^{\alpha_n}} + \delta_n\right)^{r_n} - \delta_n^{r_n},$$

where $\varepsilon$ is a constant value, $\alpha_n$ is a learned exponent for the normalization for the channel n, $\delta_n$ is the learned offset for channel n, and $r_n$ is the learned exponent for channel n. Thus, in this particular example, the system learns a respective value of $s_n$, $\alpha_n$, $\delta_n$ and $r_n$ for each of the N channels.

Figure 4:
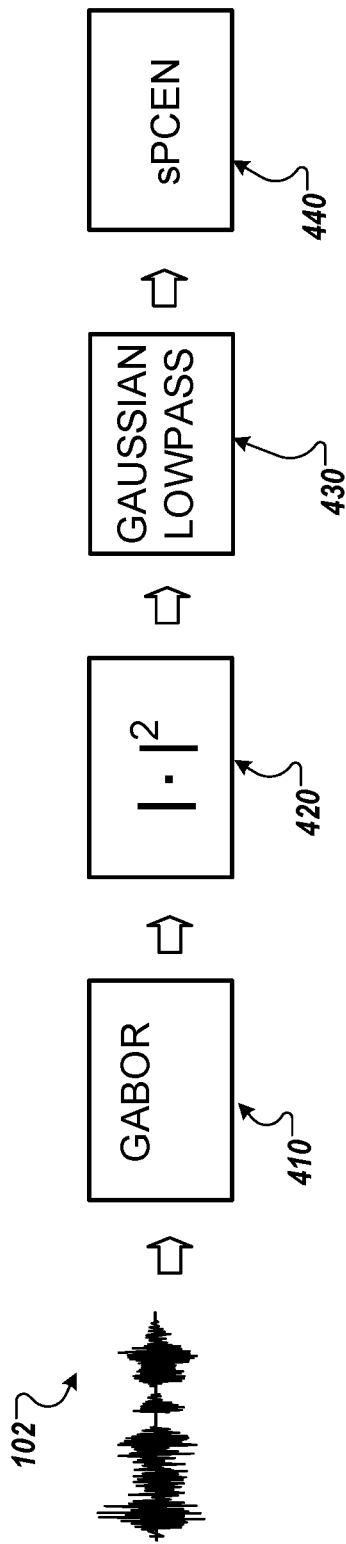
FIG. 4 illustrates the training of the policy neural network using a demonstration sequence.

FIG. 4 illustrates an example of the operation of the learned audio frontend model.

As shown in FIG. 4, the audio waveform 102 that has T audio samples is first processed using a learned filtering operation to generate a filtered representation, i.e., a sequence of filtered features that includes T filtered features that each have N channels. The learned filtering operation first applies N learned Gabor filters 410 of length W to the input audio waveform 120 and then applies a squared modulus operator 420 to the output generate a filtered representation.

Alternatively, the system can apply the Gabor filters using 2N real valued filters rather than N complex valued Gabor filters as described above, i.e., by splitting real and imaginary part of the Gabor filter, convolving inputs with each one independently, and then merging the result using squared l2-pooling.

The filtered representation is then processed using a learned pooling operation to generate a pooled representation. The learned pooling operation applies a respective Gaussian lowpass filter 430 to each channel of the filtered representation to reduce the temporal resolution of the filtered representation and generate the pooled representation.

The pooled representation is then processed using a learned normalization operation to generate the feature representation. The learned normalization operation applies the sPCEN operations 440 described above to generate the feature representation.

The feature representation can then be provided to a downstream audio processing neural network for processing, as described above.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining an audio waveform comprising a sequence of audio samples at a first frequency;
    processing the audio waveform using a learned audio frontend model to generate a feature representation of the audio waveform, wherein the feature representation comprises a sequence of features at a second frequency, wherein the second frequency is lower than the first frequency, and wherein the learned audio frontend model is configured to:
        apply a machine-learned filtering operation having a plurality of filtering parameters to the audio waveform to generate a filtered representation comprising a sequence of filtered features at the first frequency, wherein each filtered feature has a respective value for each of a plurality of channels;
        apply a machine-learned pooling operation having a plurality of pooling parameters to the filtered representation to generate a pooled representation comprising a sequence of pooled features at the second frequency comprises:
            for each channel, applying, with stride greater than one, a respective learned lowpass filter for the channel to the values in the filtered features for the channel to generate a set of pooled values for the channel that have the second frequency; and
        apply a machine-learned normalization operation having a plurality of normalization parameters to the pooled representation to generate the feature representation; and
    processing the feature representation using a first audio understanding machine learning model having a plurality of audio understanding parameters to generate a respective output for each of one or more audio understanding tasks, and wherein the learned audio frontend model and a second audio understanding machine learning model have been trained end-to-end on a set of at least one training audio understanding task to determine the filtering parameters of the machine-learned filtering operation, the pooling parameters of the machine-learned pooling operation comprising parameters of the respective learned lowpass filters for the plurality of channels, and the normalization parameters of the machine-learned normalization operation.

2. The method of claim 1, wherein the learned audio frontend model and the audio understanding machine learning model have been trained end-to-end on at least one of the audio understanding tasks to determine the filtering parameters, the pooling parameters, and the normalization parameters.

3. The method of claim 1, wherein each filtered feature comprises a respective value for each of a plurality of channels and wherein applying the learned filtering operation comprises, for each channel:
applying one or more one-dimensional convolutional filters to the audio waveform to generate the respective values for the channel.

4. The method of claim 3, wherein applying one or more one-dimensional convolutional filters to the audio waveform to generate the values for the channel comprises:
applying a plurality of one-dimensional convolutional filters to the audio waveform to generate a plurality of convolved values; and
combining the convolved values to generate the respective values for the channel.

5. The method of claim 4, wherein each of the plurality of one-dimensional convolutional filters are Gabor filters.

6. The method of claim 1, wherein the respective learned lowpass filter for each channel has a Gaussian impulse response.

7. The method of claim 1, wherein each pooled feature has a respective value for each of a plurality of channels, and wherein applying a learned normalization operation having a plurality of normalization parameters to the pooled representation to generate the feature representation comprises, for each respective value for each of the plurality of channels of each pooled feature:
normalizing the respective value of the plurality of channels using an exponential moving average of the values for the channel in any pooled features that are before the pooled feature in the sequence, wherein the moving average is controlled by a respective smoothing coefficient.

8. The method of claim 7, wherein a different respective smoothing coefficient is learned for each of the plurality of channels.

9. The method of claim 7, wherein applying a learned normalization operation having a plurality of normalization parameters to the pooled representation to generate the feature representation comprises, for each respective value for each of the plurality of channels of each pooled feature:
adding a learned offset to the normalized value to generate a sum; and
applying compression to the sum using a learned exponent.

10. The method of claim 1, wherein the first audio understanding machine learning model and the second audio understanding machine learning model are the same.

11. One or more non-transitory computer-readable storage media encoded with instructions that, when executed by one or more computers, cause the one or more computers to perform operations comprising:
obtaining an audio waveform comprising a sequence of audio samples at a first frequency;
processing the audio waveform using a learned audio frontend model to generate a feature representation of the audio waveform, wherein the feature representation comprises a sequence of features at a second frequency, wherein the second frequency is lower than the first frequency, and wherein the learned audio frontend model is configured to:
apply a machine-learned filtering operation having a plurality of filtering parameters to the audio waveform to generate a filtered representation comprising a sequence of filtered features at the first frequency, wherein each filtered feature has a respective value for each of a plurality of channels;
apply a machine-learned pooling operation having a plurality of pooling parameters to the filtered representation to generate a pooled representation comprising a sequence of pooled features at the second frequency comprises:
for each channel, applying, with stride greater than one, a respective learned lowpass filter for the channel to the values in the filtered features for the channel to generate a set of pooled values for the channel that have the second frequency; and
apply a machine-learned normalization operation having a plurality of normalization parameters to the pooled representation to generate the feature representation; and
processing the feature representation using a first audio understanding machine learning model having a plurality of audio understanding parameters to generate a respective output for each of one or more audio understanding tasks, and wherein the learned audio frontend model and a second audio understanding machine learning model have been trained end-to-end on a set of at least one training audio understanding task to determine the filtering parameters of the machine-learned filtering operation, the pooling parameters of the machine-learned pooling operation comprising parameters of the respective learned lowpass filters for the plurality of channels, and the normalization parameters of the machine-learned normalization operation.

12. A system comprising one or more computers and one or more storage devices storing instructions that when executed by one or more computers cause the one or more computers to perform operations comprising:
obtaining an audio waveform comprising a sequence of audio samples at a first frequency;
processing the audio waveform using a learned audio frontend model to generate a feature representation of the audio waveform, wherein the feature representation comprises a sequence of features at a second frequency, wherein the second frequency is lower than the first frequency, and wherein the learned audio frontend model is configured to:
apply a machine-learned filtering operation having a plurality of filtering parameters to the audio waveform to generate a filtered representation comprising a sequence of filtered features at the first frequency, wherein each filtered feature has a respective value for each of a plurality of channels;
apply a machine-learned pooling operation having a plurality of pooling parameters to the filtered representation to generate a pooled representation comprising a sequence of pooled features at the second frequency comprises:
for each channel, applying, with stride greater than one, a respective learned lowpass filter for the channel to the values in the filtered features for the channel to generate a set of pooled values for the channel that have the second frequency; and
apply a machine-learned normalization operation having a plurality of normalization parameters to the pooled representation to generate the feature representation; and processing the feature representation using a first audio understanding machine learning model having a plurality of audio understanding parameters to generate a respective output for each of one or more audio understanding tasks, and wherein the learned audio frontend model and a second audio understanding machine learning model have been trained end-to-end on a set of at least one training audio understanding task to determine the filtering parameters of the machine-learned filtering operation, the pooling parameters of the machine-learned pooling operation comprising parameters of the respective learned lowpass filters for the plurality of channels, and the normalization parameters of the machine-learned normalization operation.

13. The system of claim 12, wherein the learned audio frontend model and the audio understanding machine learning model have been trained end-to-end on at least one of the audio understanding tasks to determine the filtering parameters, the pooling parameters, and the normalization parameters.

14. The system of claim 12, wherein each filtered feature comprises a respective value for each of a plurality of channels and wherein applying the learned filtering operation comprises, for each channel:
applying one or more one-dimensional convolutional filters to the audio waveform to generate the respective values for the channel.

15. The system of claim 14, wherein applying one or more one-dimensional convolutional filters to the audio waveform to generate the values for the channel comprises:
applying a plurality of one-dimensional convolutional filters to the audio waveform to generate a plurality of convolved values; and
combining the convolved values to generate the respective values for the channel.

16. The system of claim 15, wherein each of the plurality of one-dimensional convolutional filters are Gabor filters.

17. The system of claim 12, wherein the respective learned lowpass filter for each channel has a Gaussian impulse response.

18. The system of claim 12, wherein each pooled feature has a respective value for each of a plurality of channels, and wherein applying a learned normalization operation having a plurality of normalization parameters to the pooled representation to generate the feature representation comprises, for each respective value for each of the plurality of channels of each pooled feature:
normalizing the respective value of the plurality of channels using an exponential moving average of the values for the channel in any pooled features that are before the pooled feature in the sequence, wherein the moving average is controlled by a respective smoothing coefficient.

19. The system of claim 18, wherein a different respective smoothing coefficient is learned for each of the plurality of channels.

20. The system of claim 18, wherein applying a learned normalization operation having a plurality of normalization parameters to the pooled representation to generate the feature representation comprises, for each respective value for each of the plurality of channels of each pooled feature:
adding a learned offset to the normalized value to generate a sum; and
applying compression to the sum using a learned exponent.

* * * * *